3,242,475
MOTOR ALARM CIRCUIT
Howard A. Davis, Compton, Calif., assignor, by mesne assignments, to Walter Kidde & Company, Inc., a corporation of New York
Filed Oct. 31, 1961, Ser. No. 148,888
3 Claims. (Cl. 340—248)

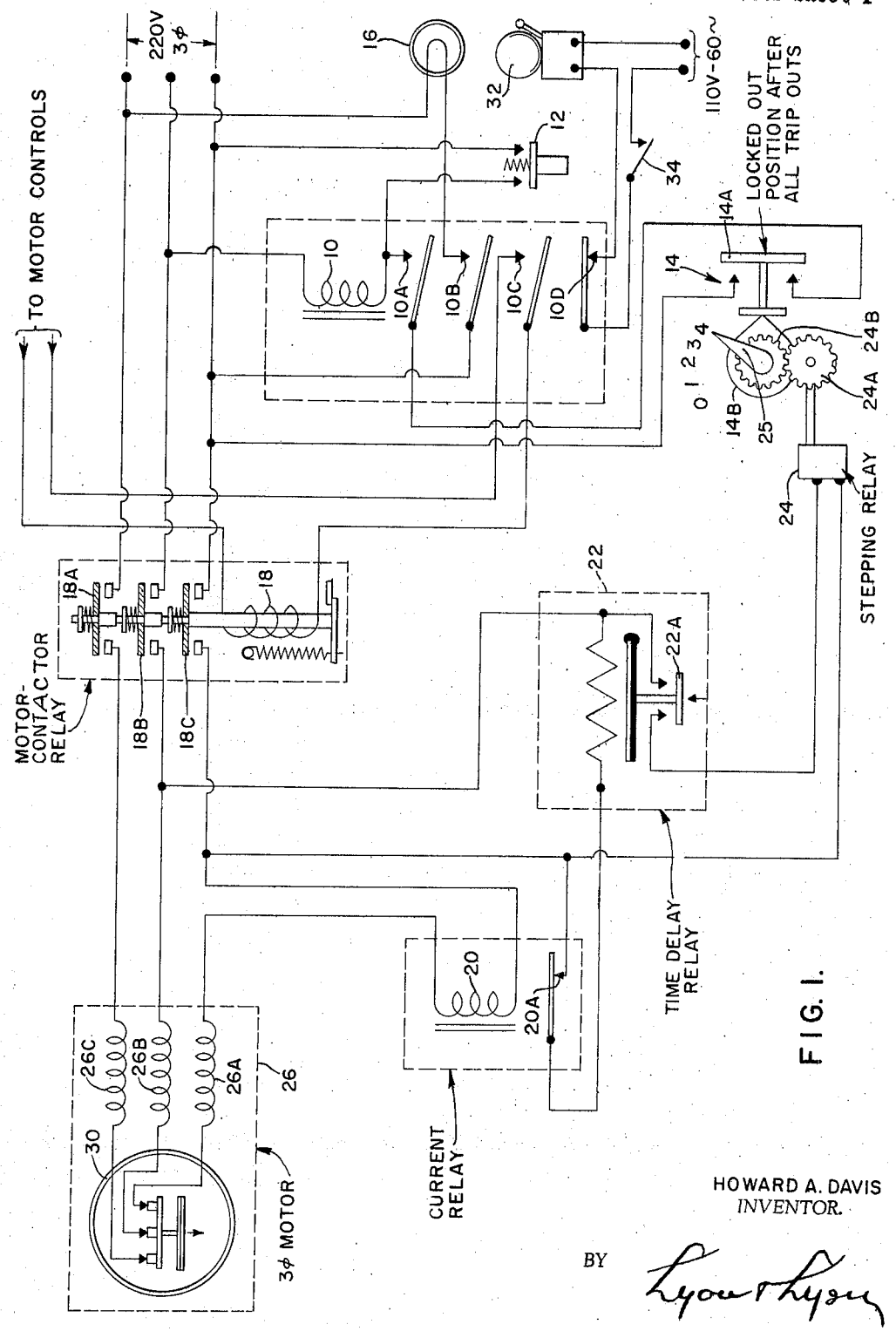

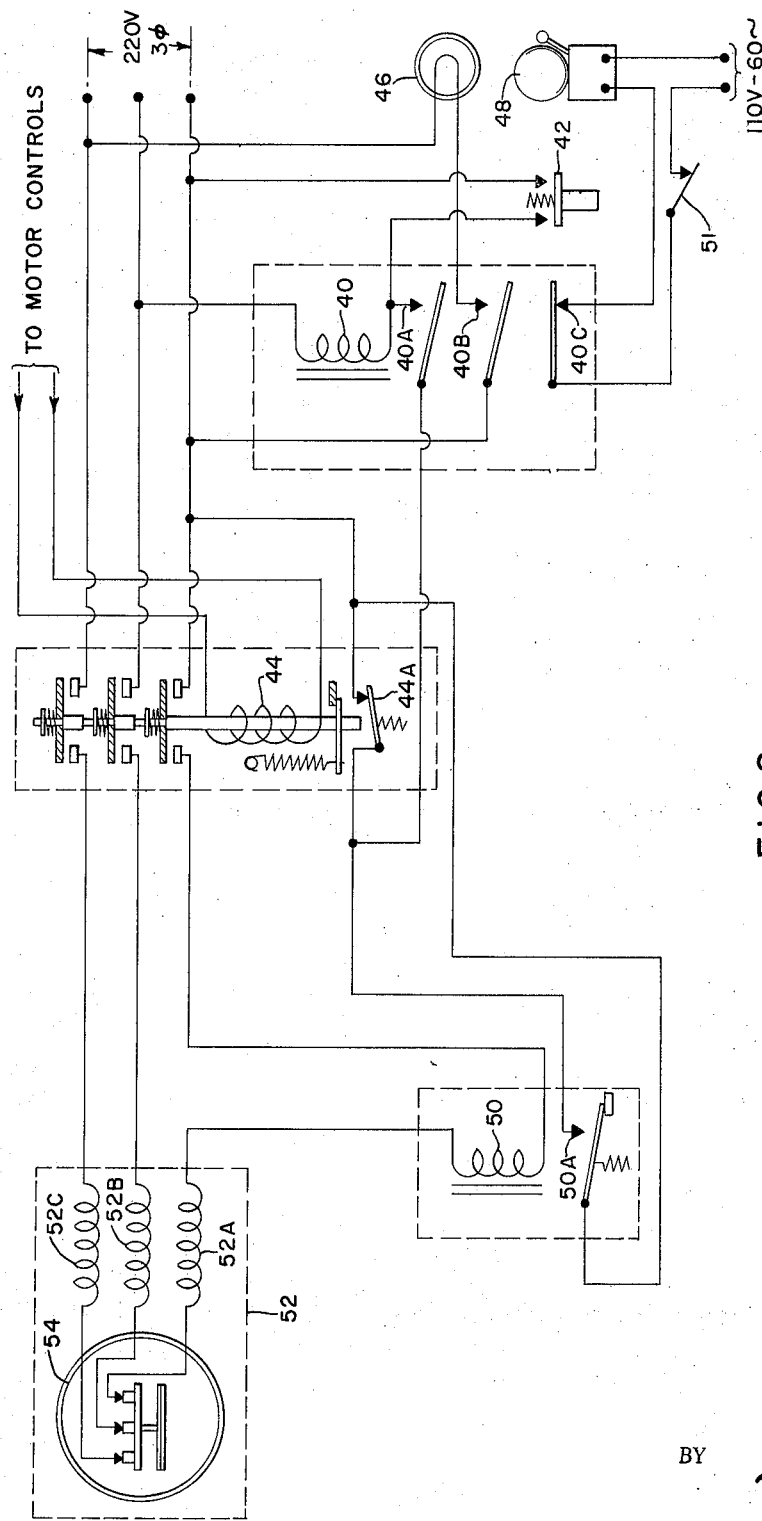

This invention relates to circuits for indicating an electric-motor malfunction and, more particularly, for indicating when a malfunction occurs in a hermetically sealed electrical motor.

Motors are presently being manufactured which have a protective device built in to them in such a manner that they normally cannot be wired to an alarm device. These protective devices, termed inherent protectors, automatically reset themselves, but make no provision for locking out the motor in the event of a failure which is not eliminated upon the elapse of a short time interval. These motors are usually hermetically or semihermetically sealed and are employed for driving refrigeration compressors.

An object of this invention is a provision of a novel alarm circuit for a motor of the type described.

Another object of this invention is the provision of apparatus for detecting either or both current and voltage failures occurring with a motor of the type described.

Yet another object of the present invention is the provision of a protective alarm circuit for a motor of the type described.

These and other objects of this invention may be achieved by providing in one embodiment of the invention a first relay, which is connected across the line connected to supply power to the motor to be protected. A second relay is provided which is connected in series with the line supplying power to the motor to be protected. Also employed is a motor contactor relay. These relays are connected so that the first relay is held operated through the contacts of the second relay, and the second relay cannot be operated until the motor contactor is operated. In the event of a malfunction in the motor, its inherent protector apparatus operates to prevent further current from reaching the motor for a time. This causes the second relay to be rendered inoperative, whereupon the first relay is rendered inoperative and can operate a suitable alarm device.

In a second embodiment of the invention, in addition to the first and second relay and the motor contactor-relay, there is also provided a relay having a slight delay, a stepping relay, and a set of cam-operated contacts. The first relay is actuated through a circuit which includes these normally closed cam-operated contacts. The second relay, which is in series with the line providing current for the motor when not operated, has a pair of normally closed contacts which apply current to the timer relay. When operated, these normally closed contacts are opened. Accordingly, should the inherent protector device of the motor be rendered operative due to a malfunction in the motor, the second relay is opened, whereupon it can enable the timer relay to operate. The timer relay, each time it is operated, actuates the stepping relay to move the cam or to index the cam. The indexed cam, after a predetermined number of operations, opens the cam-operated switch contacts, whereupon the first relay is rendered inoperative, enabling suitable alarm equipment to function.

The novel features that are considered characteristic of this invention are set forth with particularity in the appended claims. The invention itself both as to its organization and method of operation, as well as additional objects and advantages thereof, will best be understood from the following description when read in connection with the accompanying drawings in which:

FIGURE 1 is a circuit of an embodiment of the invention.

FIGURE 2 is a circuit diagram of another embodiment of the invention.

Referring now to the drawings, in FIGURE 1 there is shown a circuit diagram of an embodiment of the invention. The embodiment of the invention is shown with a three-wire, 220-volt, three-phase system. This should not be taken as a limitation upon the invention, since those skilled in the art will readily appreciate how this invention may be operated with a single-phase system. A first relay 10, which hereafter shall be referred to as the voltage relay, has three normally open contacts, respectively 10A, 10B, and 10C, and one normally closed contact 10D. One side of the relay coil is connected to one of the three-phase lines, and the other side of the relay coil is connected to the terminal of normally open contact 10A and also through a reset switch 12 to one of the other of the three-phase lines.

The normally open contacts 10A serve as a self-latching set of contacts for the relay 10. This may be seen by following the line which connects these contacts to the second of the three-phase lines. This connection extends from the contact pair 10A through the contact of a cam-operated switch 14, back to the three-phase power line. The cam-operated switch 14 includes the switch contacts 14A, the cam 14B, and a means for biasing the switch contacts 14A in a closed position. The cam-operated switch 14 is shown in its open or lockout position, to which it is operated after the inherent protector of the motor with which the apparatus in accordance with this invention is associated has reset a predetermined number of times, here indicated as four times. The operation of the cam-operated switch will become more clear as this explanation progresses.

Contact pair 10B is used to apply voltage to a light 16 when the voltage relay 10 is operated. It will be noted that the light is connected across the first and third of the three-phase lines, where the voltage relay itself is connected across the first and second of these three-phase lines. Thus, the light may indicate a voltage failure across these two lines, even though the voltage relay remains operated. The relay-contact pair 10C is in series with the normal motor controls (not shown) for energizing the motor-contactor relay 18. This is the relay which has three normally open contact pairs 18A, 18B, and 18C, which are connected in series with the three-phase lines to the motor. In accordance with the circuit just described, the normal controls for the three-phase motor cannot operate the motor-contactor relay 18 unless and until the voltage relay 10 has been energized.

On the motor side of the motor-contactor relay 18 a relay 20, hereafter referred to as the current relay, has its coil connected in series with one of the three-phase lines. The relay 20 has a normally closed contact pair 20A. This normally closed contact pair connects one of the three-phase lines to one side of the coil of a time-delay relay 22. The other side of the coil of the time-delay relay is connected to one of the other three-phase lines. This other side of the coil of the relay 22 is connected through a set of normally open contacts 22A (when closed) to a stepping relay 24. The stepping relay is connected back to the three-phase lines, so that when the contacts 22A are closed they will apply a current pulse to the stepping relay to enable it to index the cam 14B through a pair of gears 24A, 24B. These gears also carry an indicator pointer 25, whereby the number of times that the motor operation has been interrupted is indicated.

The three-phase motor 26 has its windings, respectively 26A, 26B, and 26C, shown as being connected in series with the three-phase lines and also to a device known as an inherent protector 30. The inherent protector may be a thermally operated device which, when the motor temperature rises above a predetermined value, opens up the connections to the line whereby the operation of the motor is interrupted. As briefly mentioned previously, in motors which are hermetically sealed there is no way of knowing whether or not any interruption of operation has occurred, or how many times it has occurred, so that in the event of conditions being present within the hermetic housing which can really cause serious damage to an expensive motor, unless some other auxiliary means is provided, the motor will keep turning itself off and on until some serious damage has been incurred.

The operation of the invention to protect motors of the type described and to provide an indication of any conditions which may interrupt operation of the motor is as follows. First, the reset button 12 is closed to enable the relay 10 to operate. The relay is maintained operative over the self-latching coil contacts 10A. It should be noted that the cam-operated contacts 14 are at this time in the closed position with the cam being returned manually to the position at which the indicator shows a zero. After the voltage relay has been operated, the light 16 is illuminated. This indicates both that the voltage relay is operated and that there is power across the first and third lines of the three-phase power-input lines. It should be noted that the normally closed contacts 10D apply power to an alarm bell 32. A switch 34 is provided and is connected in series with the normally closed contacts 10D, so that before starting the switch 34 is opened to prevent the alarm bell from ringing. Once the reset button is pushed to cause the relay 10 to become operative, the switch contacts 34 are then closed. At this time the contacts 10D are open and the bell 32 will not sound.

When the voltage relay 10 is operated, the normal controls for the motor may be operated, whereby the contactor relay is operated. Closing of the contacts 18A, 18B, 18C enables power to be applied to the motor 26. When the motor 26 draws current, the current relay 20 can operate, whereby its normally closed contacts 20A are opened. It should be noted that if the stepping relay 24 is advanced one step, by reason of the time-delay relay 22 being connected to the line over the contacts 20A, it can now be reset to zero position.

Should the inherent protector of the motor for some reason operate, then current flow to the motor is cut off. The current relay will be rendered inoperative, closing its contacts 20A. If this is only a momentary effect, then the time-delay relay 22 will not have a chance to operate; but if this interruption is maintained for a predetermined interval, indicative of a serious condition, then the time delay relay 22 is operated. This applies a current to the stepping relay, causing it to operate the gears 24A, 24B and advance the cam 14B and the indicator therewith one increment toward the position shown in the drawings.

If thereafter conditions normalize again and the inherent protector closes, whereby current can again be applied to the motor, the current relay is operated again. An observer can look at the indicator 25 and see that there had been an interruption in operation of the motor, due to actuation of its inherent protector. As shown in the drawings, the inherent protector can interrupt operation to the motor four times. At the fourth interruption, the motor will not be able to automatically commence operation again, in view of the fact that the switch contacts 14A are operated to their open position by the cam 14B. This interrupts power to the winding of the voltage relay 10 over the self-latching contacts 10A. Relay 10 becomes inoperative, with the result that the light goes off and the alarm bell begins to ring. This draws attention to the fact that a serious situation has arisen in the hermetically sealed motor and should be investigated before the motor is started again. It should be noted that in addition to sounding the alarm, when relay 10 is rendered inoperative, it prevents the application of operating potential to the relay 18 due to opening of contacts 10C.

After the condition which caused the inherent protector of the motor to become operative is corrected, the cam 14B is returned to the initial position by manually rotating it back. The reset button 12 can then be operated to cause the voltage relay 10 to become operative, whereby the remaining relays for starting the motor and for monitoring its operation can become operative.

Reference is now made to FIGURE 2, which shows another embodiment of the invention, which omits the time-delay relay, the stepping relay, and the cam-operated switch. In this embodiment of the invention there is also provided a voltage relay 40, which has one side of its relay winding connected to the center one of the three-phase lines and the other side connected through the reset switch 42 to one of the other of the three-phase lines. This relay 40 has associated therewith two normally open contact pairs 40A, 40B and a normally closed contact pair 40C. The normally open contact pair 40A also serves the function of a pair of latching contacts. It connects the side of the relay winding which is connected to the reset switch 42 back to the three-phase lines through a circuit including the normally closed contacts 44A of a motor contactor relay 44. The winding of the motor contactor relay 44 is connected to the normal motor controls (not shown) directly, and not through one of the contact pairs of the voltage relay 40, as was the case in FIGURE 1. A light 46 is connected across the outermost two of the three-phase lines through the normally open contact pair 40B.

An alarm bell 48 is connected to a source of exciting power through a switch 51, which is in series with the normally closed contact pair 40C. The self-latching normally open contact pair 40A is also connected in series with the normally open contact pair 50A of a current relay 50. Effectively, this normally open contact pair 50A is connected in parallel with the normally closed contact pair 44A of the contactor relay 44. The winding of the current relay 50 is connected in series with one of the three-phase lines. The three-phase lines connect to a motor 52, which has the windings 52A, 52B, 52C, which, in turn, are connected to an inherent protector 54. As previously indicated, the inherent protector and the motor windings are hermetically enclosed, with only three terminals on the exterior being provided for electrical access thereto.

When it is desired to operate the motor 54, a first reset button 42 is closed, whereby the relay 40 is rendered operative and is held operative over a path including the self-latching contacts 40A and the normally closed contacts 44A of the relay 44. Thereafter, the normal controls of the motor (not shown) are operated, whereby the relay 44 can operate, applying power to the motor 52. Before the contacts 44A are opened by operation of the armature of the relay 44, the current relay 50 is rendered operative. As a result, its normally open contact pair 50A is closed, whereby the contact pair 44A is shunted; thus, when they do open, the voltage relay is maintained operative.

It will be noted that the voltage relay can be operated, either before or after the relay 44 is made operative, since the current relay 50 is operated upon operation of the relay 44, whereby power for holding the relay 40 operated is obtained through the contacts 50A. The attention of the operator who turns on the motor is directed to the fact that the voltage relay 40 is not operated by reason of the fact that light 46 will not be on when the motor starts.

If for any reason the inherent protector 54 of the motor 52 interrupts operation of the motor, the current relay 50 has its operation interrupted. As a result, the voltage relay is rendered inoperative, the light goes out, and the alarm bell rings. Thus this embodiment of the invention provides a sound and light signal indicative of something being amiss with the motor on the first operation of the inherent protector of the motor, rather than after the fourth operation, as is the case with the first described embodiment of the invention.

There has accordingly been described and shown herein an arrangement which effectively monitors the operation of a motor and provides a warning when anything adverse has happened thereto. Not only is this invention operated by reason of the operation of the inherent protector of the motor, but, should a motor winding in series with the line with which the current relay is connected open, the same warnings or alarms will be given. This invention also provides an arrangement for enabling the motor to continue to operate after a temporary interruption to such motor operation have been cleared. Furthermore, should the line voltage drop for any reason, the voltage relay which monitors voltage across two of those lines will become inoperative, indicative of some trouble occurring. Also the light which is across another two of the lines of the three-phase system can go out, indicative of a voltage failure across the two lines to which it is connected.

I claim:

1. An alarm system for protecting an electrical motor and for indicating an interruption in the operation thereof comprising a source of operating potential for said motor, a voltage responsive relay for operating indicator means, said relay having a winding and first and second normally open contact pairs, said first contact pair when closed completing a holding circuit through said voltage responsive relay winding, a current relay having a relay winding and a normally closed contact pair which is opened when current is flowing in said current relay, means including a normally open reset switch for connecting said voltage responsive relay winding across said source of operating potential, means connecting the winding of said current relay in series with said operating potential from said source and said motor, indicator means, means connecting said indicator means to said source of operating potential through the second contact pair of said voltage responsive relay, a cam-operated switch having a movable cam, said cam-operated switch having a set of normally closed contacts in series with said first contact pair and arranged to be opened when said cam has been moved to a predetermined position, stepping relay means connected to said cam of said cam-operated switch for moving said cam a predetermined amount from an initial position toward said predetermined position each time said stepping relay means is rendered operative, and means for rendering said stepping relay means operative responsive to the closing of the normally closed contacts of said current relay when interruptions of current flow to said motor render said current relay inoperative whereupon said stepping relay moves said cam toward said predetermined position, and said cam upon attaining said predetermined position opens said cam-operated contacts to render said voltage relay inoperative.

2. Apparatus as recited in claim 1 wherein said means for rendering said stepping relay operative responsive to the closing of said normally closed current-relay contacts includes a time-delay relay, said time-delay relay having a winding and a set of normally open contacts, means connecting said time-delay relay winding to said source of operating potential through the normally closed contacts of said current relay, and means connecting said stepping-relay winding to said source of operating potential through the normally open contacts of said time-delay relay.

3. An alarm device for indicating the interruption in operation of a motor comprising: a source of operating potential for said motor, a voltage responsive relay for operating an indicator device, said relay having a winding and first and second normally open contact pairs, a current relay having a winding and normally closed contacts which are opened when current is flowing in said current relay, means including a normally open reset switch for connecting said voltage responsive relay winding across said source of operating potential, means connecting said current relay winding in series with said source of operating potential and said motor, a stepping relay, a pair of normally closed contacts, means responsive to a predetermined number of operations of said stepping relay for causing said normally closed contacts to be opened, means for applying operating potential from said source to the winding of said voltage relay through said normally closed contacts and the first normally open contact pair of said voltage relay whereby said voltage relay will be maintained operated after momentary operation of said reset switch causes said first normally open contact pair of said voltage relay to be closed, means for operating said stepping relay in response to said normally closed contacts of said current relay being closed whereby after said current relay has been rendered inoperative a predetermined number of times said voltage relay is rendered inoperative, an indicator device, and means for applying operating potential from said source to said indicator device through the second normally open contact pair of said voltage relay.

References Cited by the Examiner
UNITED STATES PATENTS

| | | | |
|---|---|---|---|
| 1,501,699 | 7/1924 | Bliss. | |
| 1,840,077 | 1/1932 | Bear | 340—248 |
| 2,006,254 | 6/1935 | Anderson | 317—22 |
| 2,275,883 | 3/1942 | Bany | 340—255 |
| 2,736,009 | 2/1956 | Barnickel | 318—490 XR |

NEIL C. READ, *Primary Examiner.*

SAMUEL BERNSTEIN, *Examiner.*